United States Patent [19]

Friedel, Jr. et al.

[11] 4,033,099
[45] July 5, 1977

[54] TOMATO HARVESTING EMPLOYING ELECTRONIC SORTING

[75] Inventors: William C. Friedel, Jr., Rio Vista; Thomas S. Bettencourt, Isleton; Daniel L. Freeman, Rio Vista, all of Calif.

[73] Assignee: The Regents of the University of California, Berkeley, Calif.

[22] Filed: Oct. 24, 1975

[21] Appl. No.: 625,542

[52] U.S. Cl. .............................. 56/327 R; 56/16.5; 171/18; 171/20; 171/130

[51] Int. Cl.² ........................................ A01D 46/00

[58] Field of Search ............... 56/327 R, 16.5, 16.6; 171/18, 20, 14, 111, 130; 209/111.5, 111.6, 111.7; 119/22

[56] References Cited

UNITED STATES PATENTS

| | | | |
|---|---|---|---|
| 3,109,413 | 11/1963 | Patchett | 119/22 X |
| 3,390,768 | 7/1968 | Button | 56/327 R |
| 3,579,968 | 5/1971 | Hill | 56/327 R |

*Primary Examiner*—J.N. Eskovitz
*Attorney, Agent, or Firm*—Owen, Wickersham & Erickson

[57] ABSTRACT

A known and commercially available electronic sorter is positioned between the sorting conveyor of a tomato harvester and the front cross-conveyor thereof. This sorter includes a rejector mechanism for rejecting tomatoes of colors other than those corresponding to red-ripeness. A rejection chute receives culls impelled thereinto by the rejector mechanism dropping the rejected fruit on the ground, while accepted fruit falls to a front cross-conveyor. A preparatory mechanism associated with the sorting conveyor impels the tomatoes at a desired trajectory toward the electronic sorter, and preferably includes an elevating flighted conveyor for receiving tomatoes from the sorting conveyor, raising them to a higher level, and then dropping them forwardly on to an intermediate generally level conveyor. The intermediate conveyor is driven at a constant speed regardless of the speeds of all other moving parts of said harvester. A dampening mechanism engages the tomatoes on the intermediate conveyor and brings them to relative rest thereon, so that there is substantially no relative movement between the tomatoes and the intermediate conveyor as they approach the forward end thereof, so that the forward end of said intermediate conveyor thereby impels all tomatoes thereon at the desired trajectory toward the electronic sorter.

14 Claims, 6 Drawing Figures

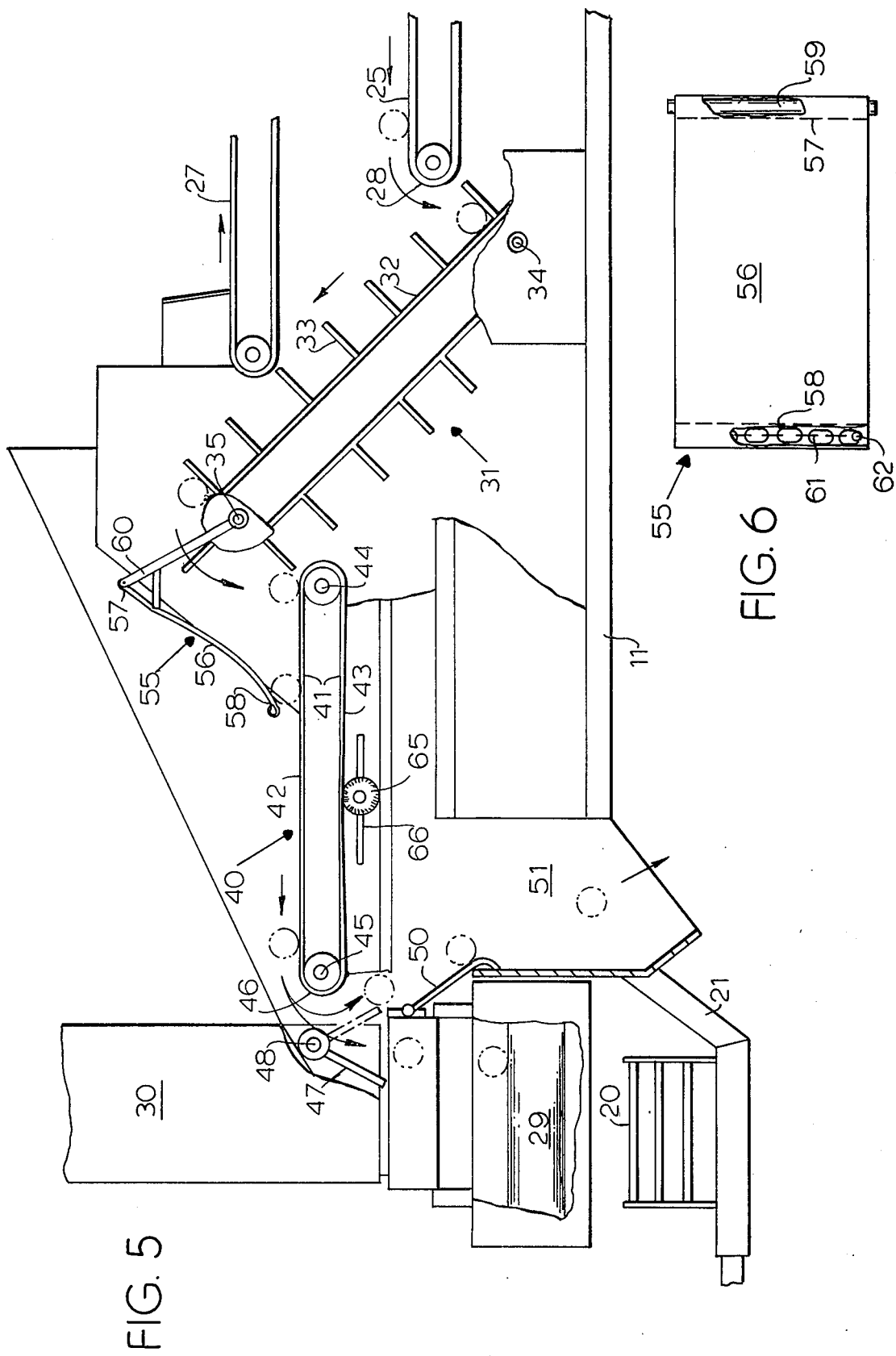

4,033,099

TOMATO HARVESTING EMPLOYING ELECTRONIC SORTING

BACKGROUND OF THE INVENTION

This invention relates to the incorporation of electronic sorting equipment in a field tomato harvester.

Electronic sorting machines have been placed on the market commercially. These electronic sorters operate on the basis of color. When tomatoes are ripe, their skin color is a good tomato red. Green tomatoes are obviously unripe, and tomatoes that are still yellow or have not reached a certain degree and intensity of redness, are unripe. The electronic sorter is able to distinguish between these various colors of tomatoes by causing light of a certain spectrum range to be reflected off them and back into the electronic sorter. The electronic sorter is provided with swinging fingers that are able to engage unripe tomatoes and deflect them from a normal path that ripe tomatoes follow. These machines have been perfected to the extent that each finger can make as many as ten decisions a second and act on those decisions, so that they can handle large quantities of tomatoes.

The basic problem to which this invention is directed is the adaptation of such an electronic sorter to tomato harvesters.

A typical tomato harvester has some sort of pickup means for severing and picking up the tomato plants from a field, elevating means for raising them to a desired height, and separating means for detaching the tomatoes from the plants and then placing them in a different stream from the remainder of the plant material. This is probably best accomplished by a shaking apparatus of well-known type. Once the tomatoes have been separated, they, along with as little extraneous material as possible, are usually routed by suitable cross-conveyors at the rear of the harvester, into forwardly travelling sorting conveyors, usually one on each side of the harvester. Alongside these are platforms which heretofore have had to support a number of workers, up to a dozen on each side, all of them performing a hand-sorting operation, judging the ripeness of the tomatoes by color and also noting whether they are spoiled or damaged. These sorters have discarded the culls. The sorted tomatoes which were not discarded have heretofore fallen off the forward end of the sorting conveyor on to a suitable front cross-conveyor which moved them into a takeoff conveyor where they were loaded into truck trailers, usually moving along the field parallel to the tomato harvester.

Electronic sorters are very attractive, because hand sorting is expensive while it requires only a low degree of skill. It is boring and yet demanding work, and the cost of employing so many people is so great that many tomato growers believe that an expensive electronic sorting device will enable them to save money and even to pay for the devices in the first year they use it. This does not mean that hand sorting can be entirely dispensed with, as will be seen, but it does mean that it can be reduced to a very low level.

Thus, it is desirable to provide a suitable structure by which tomato harvesters can be adapted to electronic sorting. Several problems are related to this adaptation. One of the problems is that the electronic sorter requires that the tomatoes it is sorting be moving in a substantially constant type of trajectory; in other words, that all the tomatoes drop off the forward edge of a conveyor at the same speed and fall toward a desired end point by a path from which it is to be deflected only if rejected. This is somewhat difficult to achieve because tomatoes are round and tend to roll; moreover, there has been a comparatively small amount of space in which to squeeze such an electronic sorting operation without very expensive modification of the machine construction and without creating other disadvantages, such as awkward locations for the electronic sorters.

Another problem brought about by electronic sorting is that since the tomatoes are to be sorted by color, it is important for the tomatoes to come from a conveyor which will not introduce false values that reduce the accuracy of the sorting. This means that the conveyor forms a background reflecting or not reflecting the light which is projected on the tomatoes. If the belt is the wrong color or if it changes color, there may be rejections where there should be acceptances and therefore a reduction in the crop harvested, tomatoes which should not be culled out, being culled out.

The heights and lateral or longitudinal distances available on a tomato harvester are such that the adaptation of the harvester to electronic sorting involves relatively short distances within which a number of functions have to be performed.

SUMMARY OF THE INVENTION

The electronic sorter is positioned in between the sorting conveyor and the front cross-conveyor, and so must the apparatus which feeds the tomatoes to this electronic sorter. A rejection chute is provided to trap the culls when they are rejected and to carry them on to the ground. The invention calls for preparatory means for causing the tomatoes to be impelled toward the electronic sorter at a desired trajectory and under the desired lighting conditions.

A preferably structure for accomplishing this preparatory work includes an elevating means for raising the tomatoes from the sorting conveyor to a desired height. This is preferably done by a flighted conveyor, which may extend up at about 45° or at some other suitable angle. The tomatoes then drop off the elevating conveyor at the upper end of it and fall forwardly. They fall on an intermediate, generally level conveyor located at a height substantially above that of the sorting conveyor.

This intermediate conveyor is colored a tomato red, so as to have a good background for operation of the electronic sorter. The intermediate conveyor is operated to run at a predetermined constant speed, which is not related to the speed of anything else on the tomato harvester but is solely operated to impel tomatoes from its forward end at the desired trajectory downwardly and towards the electronic sorter, as well as towards the front cross-conveyor.

It is important, in order for the intermediate conveyor to be effective, that the tomatoes come to rest thereon, that is, that before they reach the forward end, the tomatoes be moving at the same rate as the conveyor and are not moving faster or slower than the intermediate conveyor. This is achieved in the present invention by dampening means. A preferred form of dampening means comprises a flexible sheet of suitable material, generally rectangular in shape, with one end extending widthwise of the intermediate conveyor and located above it and above the upper end of the elevating means. The lower end rests loosely widthwise on the intermediate conveyor. This lower end is preferably weighted, preferably flexibly so, so that tomatoes can pass beneath it by raising a portion of the lower end. By having to do this the tomatoes are slowed down to the speed of the conveyor rather than rolling forwardly and then rolling off it at an increased trajectory, which might cause acceptance even though it was the wrong color simply because of moving too fast for the electronic sorter to reject it.

As stated above, it is important for the intermediate conveyor to reflect the light in the same way as a ripe tomato. In other words, it should have the same color as a ripe tomato, and it is important that this color be maintained during operation. For that reason, the present invention provides a cleaning brush located on the return reach of the intermediate conveyor to keep it clean at all times.

Other objects, advantages, and features of the invention will become apparent from the following description of a preferred embodiment.

BRIEF DESCRIPTION OF THE DRAWINGS

In the drawings:

FIG. 5 is an enlarged view in side elevation of a portion of FIG. 2, with portions broken away.

FIG. 6 is a plan view of a dampener sheet shown in FIG. 5, with portions broken away.

DESCRIPTION OF A PREFERRED EMBODIMENT

Figure 1:
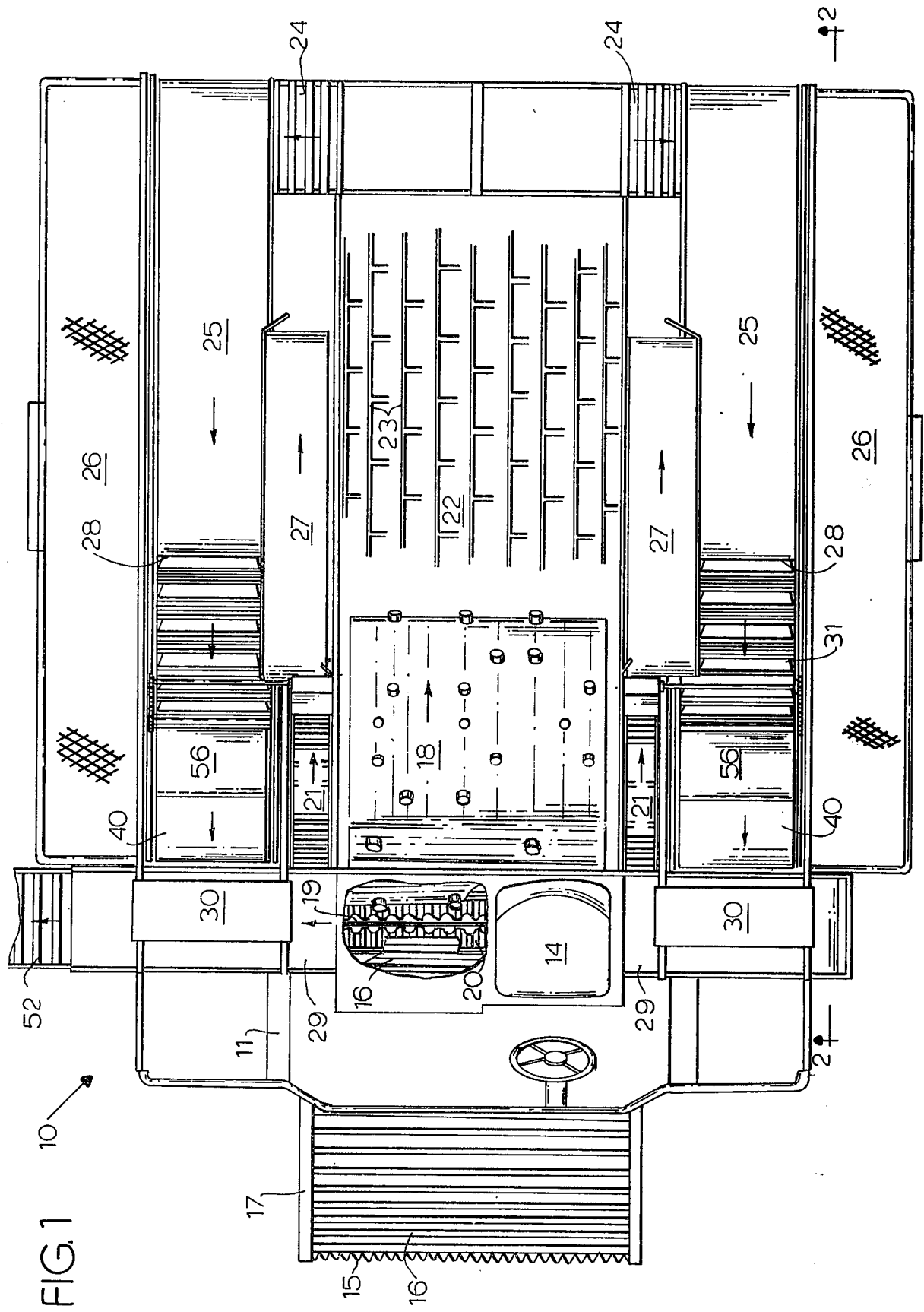
FIG. 1 is a top plan view of a tomato harvester embodying the principles of the invention. Some parts are shown somewhat schematically, since they are quite familiar and well known. The directions of movement of the conveyors are indicated by arrows. Parts are broken away.
Figure 2:
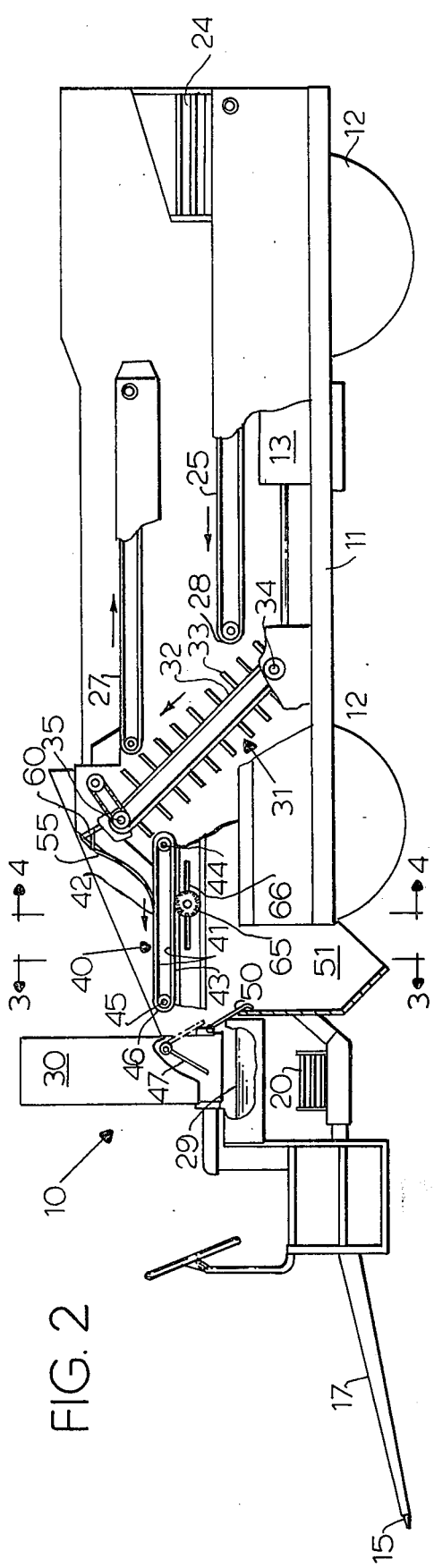
FIG. 2 is a view in side elevation and partly in section of the device taken along the section line 2—2 in FIG. 1, with parts broken away.
Figure 4:
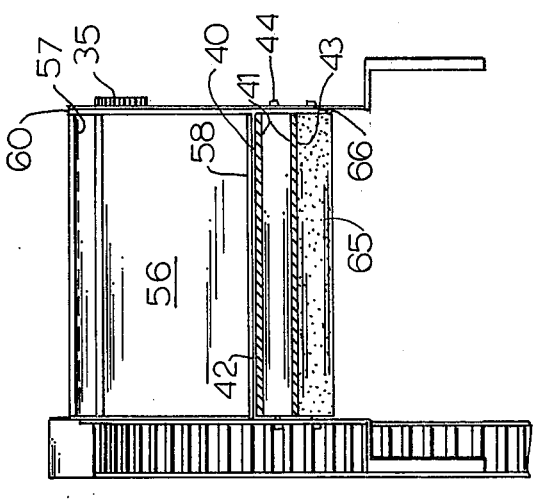
FIG. 4 is a view in section taken along the line 4—4 in FIG. 2.
Figure 3:
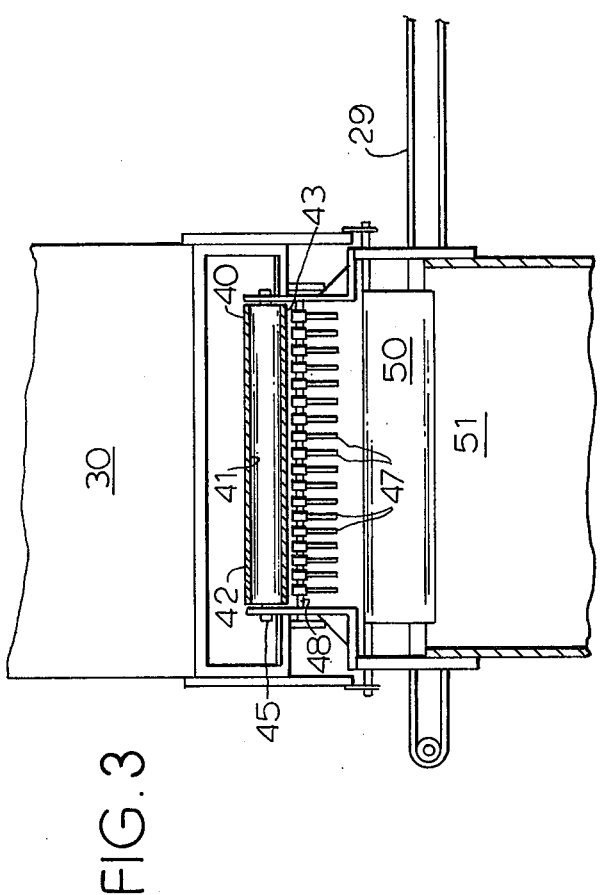
FIG. 3 is a view in section taken along the line 3—3 of FIG. 2.

A tomato harvester 10 is shown in top plan view in FIG. 1 and in side elevation in FIG. 2. The harvester has a main frame 11 supported on wheels 12. A suitable engine 13 is supported on the frame 11 for providing the motive power, not only for moving the tomato harvester 10 through the field, but also for causing the various pickup devices, elevators, conveyors, and so on, to move. Proper adjustment is easily obtained by known means. The tomato harvester 10 illustrated is only one example of a suitable such harvester, and the invention is not to be limited to this particular form of harvester, although it is a very desirable type of harvester. The driver sits in a driver seat 14 and controls the various operations.

At the forward end of the harvester 10 is a severing knife 15 which engages the tomato vines, usually somewhat below ground and severs them. The vines are then carried up by a rearwardly and upwardly moving reach 16 of a lower elevator 17, typically provided with transversely extending rods. At its upper end, the lower elevator 17 preferably transfers the plants to an upper elevator 18, via a rotating spinner 19 that partially bridges a gap between the elevators 17 and 18 through which clods and loose tomatoes can fall down on to a pair of outwardly moving cross-conveyor belts 20 and at the outer ends of these cross-conveyor belts 20 to be fed to upwardly and rearwardly moving lifting devices 21. The tomato plants, freed from most of the clods and still carrying tomatoes, are fed by the upper end of the upper elevator 18 to a separating device 22. The separating device 22, preferably comprises a shaker, such as a shaker with walking bars 23 in which the tomato vines are moved rearwardly while being also shaken up and down in order to shake the tomatoes loose. The tomatoes then drop below on to a collecting conveyor, not shown here, and then move rearwardly and upwardly. The tomato vines, denuded of tomatoes, are moved off the end of the machine.

At the rear of the machine 10 is a pair of outwardly moving cross-conveyors 24 which convey the collected tomatoes outwardly to the sides, and then they are transferred to a pair of forwardly moving sorting conveyors 25. A platform 26 is located alongside each sorting conveyor 25. These are typically made large to receive a number of workers, but when the present invention is used, there may be only one or two workers on each side. One of these workers is usually occupied principally in removing stems and leaves, which might interfere with the sorting operation, since they are green, and a few culls which evidence mold or spoilage. The other sorter usually works to transfer good tomatoes from a rearwardly moving conveyor 27 that is located above and somewhat overlapping with the sorting conveyor 25. This is the conveyor 27 that receives the clods and loose tomatoes from the lifting device 21. Many of the loose tomatoes may be either spoiled or culls on other counts, but such good tomatoes as are observed can be transferred to the sorting conveyor 25 at this stage. The platform 26 preferably extends beyond the forward end 28 of the sorting conveyor 25, to enable one to inspect the other parts of the machine as provided by the present invention.

In the present invention, the forward end 28 of each of the sorting conveyors 25 is spaced quite a bit to the rear of a forward cross-conveyor 29. Electronic sorting devices 30 are mounted substantially directly above the front cross-conveyor 29 so that they will be in or adjacent to the path of the tomatoes which are to fall upon the conveyor 29.

The space between the front end of each sorting conveyor 25 and the electronic sorter 30 is the area with which the present invention is concerned. It will be noted that if the sorting conveyor 25 is at a convenient height for sorting by hand (and one is reminded that some hand sorting is still advisable), then the conveyor 25 is too low for use of the electronic sorter 30. Therefore, the tomatoes received from the end of the sorting conveyor 25 are first raised to a suitable height. This may be done by a flighted elevator 31, as shown in FIG. 2, located adjacent the forward end of the sorting conveyor 25 to receive tomatoes dropping gently therefrom and to raise them up preferably at an angle suitable to the amount of space required for the general apparatus. As shown here, 45° is quite satisfactory, though it could be a flatter angle if more space is available. The elevator 31 comprises a belt 32 with flight slots 33 thereon, a lower drive member 34 and an upper idler roller 35. At the upper end of the elevator 31 the belt turns over the upper idler roller 35 and at that point the tomatoes drop down and somewhat forwardly.

The falling tomatoes are deposited on an intermediate conveyor 40 which has a looped belt 41 with preferably level upper reach 42 and a lower reach 43. It has a drive roller 44 at one end and an idler roller 45 at the other end. The belt 41 is preferably of ripe-red tomato color. An important feature of the invention is that this intermediate conveyor 40 is driven at the roller 44 to move at a constant speed, no matter what the other conveyors, elevators, etc., are doing. The reason is that the tomatoes are to fall off the forward end 46 of this conveyor and they are to be caused to fall off at such a speed that they achieve a desired trajectory. Thus, the intermediate conveyor 40 is also an impelling device for operation in conjunction with the electronic sorter 30. The exact speed depends on what trajectory the sorter desires or needs. The intermediate conveyor 40 is located at a desired height to give the sorting machine time to operate.

The electronic sorter 30 is shown only diagrammatically, since it is an invention of someone else, and little description here is required, except to say that it has a suitable light source that sends a light which shines on the tomatoes that are about to fall from the top surface 42 of the intermediate conveyor 40. The light may be of greenish cast to give differentiation to the red color of the ripe tomatoes, and the sorter 30 is then provided with suitable sensors which sense the intensity of the light coming back and activate a circuit that operates a series of rejecting fingers 47 which are pivotally mounted on a shaft 48 and are each provided with a suitable electrically operated means, or pneumatic means if that be desired, for causing each finger 47 to swing individually on the signal it obtains from a receptor, such as a type of photosensitive cell which is connected to the finger-impelling device 47 through a suitable electronic circuit that need not be described here. The device, as said before, is capable of discriminating at about 10 times per second, and with a rate like this it is very important for the trajectory of the tomatoes to be accurate. When the light shows that the tomato is not ripe, the appropriate finger 47 swings forwardly, as illustrated in FIGS. 2 and 5 and impels that particular tomato to fall into a divider 50 leading into a cull chute 51, and the cull chute 51 drops the cull on the ground, as a waste product. If the finger 47 does not move, the trajectory of the tomato carries the tomato on to the front cross-conveyor 29, from which it is carried away to a loading truck, as by a boom conveyor 52.

An important necessity of the present invention is for the tomato to reach the end of the intermediate conveyor 40 at the speed of that intermediate conveyor 40 — — no faster, no slower — — so that its trajectory is initiated at a constant speed, and therefore the trajectories of all tomatoes can be substantially identical. Since tomatoes are round, if they were simply dropped from the elevator 31 on to the intermediate conveyor 40 they would tend to roll, and some of them would still be rolling at substantial speeds by the time they reached the end 46 of the intermediate conveyor 40. This cannot be tolerated.

Therefore, the present invention provides for a dampening means 55 to cause the speed of the tomatoes to reach and coincide with the speed of the intermediate conveyor 40. The dampening means 55 preferably comprises a flexible sheet 56 of suitable material, such as a heavy-duty plastic or a heavy-duty cloth fabric, for example, it may be Mylar or nylon or canvas. At each end, the sheet 56 is provided with a loop-type seam 57, 58. At one end, a rigid rod 59 is secured in the seam 57, and the rod 59 is fastened to a bracket 60 on the frame of the machine 10 at a suitable point, preferably a little above the terminal path of the lifting elevator 31, so that the sheet 56 covers the tomatoes at that point as they fall down to the intermediate conveyor 40. At the other end, the sheet 56 is weighted as by providing a link-type chain 61 which extends through the loop seam 58 and is secured in place at each end as by a screw, stud or rivet 62. The flexibility of the chain 61 enables a portion of the lower end of the sheet 56 to be raised while the reset remains down. The sheet 56 is made long enough so that it will drape and so that the tomatoes will have to come into contact with it before they can proceed beyond it. Thus, the tomatoes are slowed down and are brought exactly to the speed of the intermediate conveyor 40 by the time they pass out from under the flexible sheet 56, and from then on, they move forward at exactly the speed of the intermediate conveyor 40. This means that the trajectory will be accurate.

In order to maintain the red-ripe color of the conveyor belt 41, its surface must be kept clean. Harvesting in the field is typically a dusty operation, and sometimes there is also mud. This cleaning is accomplished in the present invention by providing a rotary brush 65 rotatably secured to a frame portion 66 which holds the brush 65 in firm cleaning engagement with the outer surface of the conveyor belt 41. In order to be out of the way of the operation, it is preferably located where it engages the lower surface of the return reach 43 of the belt 41, as shown in FIGS. 2 and 5. With this brush 65 in operation, the belt surface can be kept sufficiently clean so that usually it is not necessary to give the belt 41 any additional cleaning during the day; without it, it would be necessary to clean it quite often by hand. Under even very adverse conditions the cleaning brush 65 gives a substantial assistance in keeping the belt 41 clean and may, even under rather adverse conditions, operate without any additional cleaning of the belt, even though periodically it is a good idea to wash off the belt with something resembling an automobile windshield wiper squeegee. This has to be done only once or twice a day, however, under most conditions with the device as shown.

In operation, the tomato harvester 10 cuts off the tomato vines, elevates them, frees them from clods and loose tomatoes and carries the plants on to the separator 22 in a manner made familiar by several patents in this field. The separator 22 shakes them in the known manner and detaches the tomatoes from the vines. Then the tomatoes are carried by a collecting conveyor up to the outwardly moving rear cross-conveyors 24 which transfers them on to the sorting conveyors 25. In the meanwhile, the clods and loose tomatoes that were separated during the elevating operation are set out to each side and then carried up by lifting conveyors 21 and deposited on a conveyor 27 which moves rearwardly, at a level above the sorting conveyor 25 and within reach of a sorter standing on the sorter platform 26. The sorter or sorters are careful to remove green material, such as leaves and stems, and also overripe tomatoes, or spoiled ones, but they leave alone the remaining tomatoes on the sorting conveyor 25. One of the sorters takes the good tomatoes from the rearwardly moving conveyor 27 and transfers them to the sorting conveyor 25.

From then on the operation may be automatic, with the tomatoes being fed from the sorting conveyor 25 to the elevator 31, which then drops them on the intermediate conveyor 40. There, the dampening device 65 operates to slow the tomatoes down to the speed of the intermediate conveyor 40. The intermediate conveyor 40 then drops them off in a trajectory at a constant rate. The electronic sorter 30 flicks off culls into the cull chute 51 and permits the good tomatoes to fall on to the front cross-conveyor 29. The cross-conveyor 29 then transfers them to a boom conveyor 52 that takes them off for automatic deposit into other devices, such as bins supported on trucks. The belt is kept clean by contact with the brush so that the operation continues at good efficiency.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. In a tomato harvester having pickup means for severing and picking up tomato plants from a field, elevating means for raising them to a desired height, separating means for detaching the tomatoes from the plants and separating them therefrom, tomato conveyor means for conveying the detached and separated tomatoes, and cross-conveyor means for receiving selected tomatoes after sorting, the combination of:

electronic sorting means positioned between said tomato conveyor means and said cross-conveyor means and comprising rejector means for rejecting culls and impelling them away from a normal trajectory, a rejection chute into which said rejector means impels the rejected culls, said chute dropping the rejected culls on the ground, while the selected tomatoes, being non-rejected fruit, fall by said normal trajectory to said cross-conveyor means, and preparatory means in between said tomato conveyor means and said electronic sorting means for impelling tomatoes at said normal trajectory toward said electronic sorting means.

2. The combination of claim 1 wherein said preparatory means comprises:

second elevating means located immediately downstream of the downstream end of said tomato conveyor means for receiving the tomatoes from said tomato conveyor means and raising them to a higher level and then depositing them downstream, intermediate conveyor means downstream of said second elevating means, higher than said tomato conveyor means, and on which the tomatoes are dropped by said second elevating means, for moving the tomatoes dropped thereon at a constant predetermined speed regardless of the speeds of all other moving parts of said harvester, and for impelling tomatoes from the downstream end of said intermediate conveyor means at said normal trajectory toward said electronic sorting means.

3. In a tomato harvester having pickup means for severing and picking up tomato plants from a field, elevating means for raising them to a desired height, separating means for detaching the tomatoes from the plants and separating them therefrom, tomato conveyor means for conveying the detached and separated tomatoes, and cross-conveyor means for receiving selected tomatoes after sorting, the combination of:

electronic sorting means positioned between said tomato conveyor means and said cross-conveyor means and comprising rejector means for rejecting culls and impelling them away from a normal trajectory, a rejection chute into which said rejector means impels the rejected culls, said chute dropping the rejected culls on the ground, while the selected tomatoes, being non-rejected fruit, fall by said normal trajectory to said cross-conveyor means, and preparatory means in between said tomato conveyor means and said electronic sorting means for impelling tomatoes at said normal trajectory toward said electronic sorting means, said preparatory means comprising:

second elevating means located immediately downstream of the downstream end of said tomato conveyor means for receiving the tomatoes from said tomato conveyor means and raising them to a higher level and then depositing them downstream, intermediate conveyor means downstream of said second elevating means, higher than said tomato conveyor means, and on which the tomatoes are dropped by said second elevating means, for moving the tomatoes dropped thereon at a constant predetermined speed regardless of the speeds of all other moving parts of said harvester, and for impelling tomatoes from the downstream end of said intermediate conveyor means at said normal trajectory toward said electronic sorting means, said intermediate conveyor means including dampening means for engaging the tomatoes dropped on said intermediate conveyor means and bringing them to relative rest thereon, so that there is substantially no relative movement between said tomatoes and said intermediate conveyor as they approach the downstream end thereof.

4. The combination of claim 3 wherein said dampening means comprises a generally rectangular flexible sheet having an upstream end supported above the upper end of said elevating means and a downstream end which is flexibly weighted and lies limply on said intermediate conveyor means for being lifted by the tomatoes as they pass thereunder on said intermediate conveyor means.

5. The combination of claim 2, wherein said intermediate conveyor means comprises a continuous belt having a return reach, and cleaning means supported in contact with the lower surface of said return reach for cleaning said belt constantly.

6. In a tomato harvester having pickup means for severing and picking up tomato plants from a field, elevating means for raising them to a desired height, shaking means for detaching the tomatoes from the plants and separating them from the remainder of the plant material, forwardly travelling sorting conveyor means for conveying the tomatoes forwardly, platform means for supporting hand sorters beside said sorting conveyor means, front cross-conveyor means for receiving sorted-over and selected tomatoes, and take-off and loading conveyor means for receiving the tomatoes from said front cross-conveyor means and depositing them in a moving receptor, the combination of:

electronic sorting means positioned between said sorting conveyor means and said front cross-conveyor means and comprising rejector means for rejecting and impelling tomatoes of colors lying outside a selected spectral range and intensity, a rejection chute into which said rejector means impels rejected fruit, said chute dropping the rejected fruit on the ground, while non-rejected fruit falls to said front cross-conveyor means as said sorted-over and selected tomatoes, and preparatory means in between said sorting conveyor means and said electronic sorting means for impelling tomatoes at a desired trajectory toward said electronic sorting means.

7. In a tomato harvester having pickup means for severing and picking up tomato plants from a field, elevating means for raising them to a desired height, shaking means for detaching the tomatoes from the plants and separating them from the remainder of the plant material, forwardly travelling sorting conveyor means for conveying the tomatoes forwardly, platform means for supporting hand sorters beside said sorting conveyor means, front cross-conveyor means for receiving sorted-over and selected tomatoes and take-off and loading conveyor means for receiving the tomatoes from said front cross-conveyor means and depositing them in a moving receptor, the combination of:

electronic sorting means positioned between said sorting conveyor means and said front cross-conveyor means and comprising rejector means for rejecting and impelling tomatoes of colors lying outside a selected spectral range and intensity, a rejection chute into which said rejector means impels rejected fruit, said chute dropping the rejected fruit on the ground, while non-rejected fruit falls to said front cross-conveyor means as said sorted-over and selected tomatoes, and preparatory means in between said sorting conveyor means and said electronic sorting means for impelling tomatoes at a desired trajectory toward said electronic sorting means, said preparatory means comprising:

an elevating flighted conveyor located forwardly of the forward end of said sorting conveyor means for receiving the tomatoes from said sorting conveyor means and raising them to a higher level and then dropping them forwardly, an intermediate substantially level conveyor higher than said sorting conveyor means, between said elevating flighted conveyor means and said electronic sorting means, and on which the tomatoes are dropped thereby, means for driving said intermediate conveyor at a constant predetermined speed regardless of the speeds of all other moving parts of said harvester, and dampening means associated with said intermediate conveyor for engaging the tomatoes dropped thereon and bringing them to relative rest thereon so that there is substantially no relative movement between said tomatoes and said intermediate conveyor as they approach the forward end thereof, whereby the forward end of said intermediate conveyor impels all tomatoes therefrom at said desired trajectory toward said electronic sorting means.

8. The combination of claim 7 wherein said dampening means comprises a generally rectangular flexible sheet having a rear end rigidly supported above the upper end of said elevating flighted conveyor and a lower end which is flexibly weighted and lies limply on said intermediate conveyor, being lifted by the tomatoes as they pass thereunder on said intermediate conveyor.

9. The combination of claim 8 wherein said lower end comprises a hollow seam, a chain in said seam to provide said flexible weighting, and means holding the ends of said chain in place.

10. The combination of claim 7 wherein said intermediate conveyor is a continuous looped belt having a forwardly moving reach, a return reach therebelow, and an outer surface that supports said tomatoes on said forwardly moving reach, and a rotary brush supported for engagement with said outer surface on said return reach for cleaning said outer surface.

11. The combination of claim 7 wherein said outer surface is colored the color of ripe tomatoes and lies within said selected range and intensity.

12. In a tomato harvester having pickup means for severing and picking up tomato plants from a field, elevating means for raising them to a desired height, shaking means for detaching the tomatoes from the plants and separating them from the remainder of the plant material, forwardly travelling sorting conveyor means for conveying the tomatoes forwardly, platform means for supporting hand sorters beside said sorting conveyor means, front cross-conveyor means for receiving sorted-over and selected tomatoes, and take-off and loading conveyor means for receiving the tomatoes from said front cross-conveyor means and depositing them in a moving receptor, the combination of:

electronic sorting means positioned between said sorting conveyor means and said front cross-conveyor means and comprising rejector means for rejecting and impelling tomatoes of colors lying outside a selected spectral range and intensity, a rejection chute into which said rejector means impels rejected fruit, said chute dropping the rejected fruit on the ground, while non-rejected fruit falls to said front cross-conveyor means as said sorted-over and selected tomatoes, and preparatory means in between said sorting conveyor means and said electronic sorting means for impelling tomatoes at a desired trajectory toward said electronic sorting means, said harvester having a clod-freeing device including a gap in said elevating means through which clods and loose tomatoes fall, outwardly directed cross-conveyor means, lifting means for moving the clods and loose tomatoes rearwardly and upwardly from said outwardly directed cross-conveyor means, and rearwardly moving conveyor means on which they are deposited and lying above at one side of said sorting conveyor means and leading to a cull chute, whereby hand sorters on said platform means can transfer good loose tomatoes from said rearwardly moving conveyor means to said forwardly moving sorting conveyor means.

13. A method for sorting good tomatoes from culls on a tomato harvester moving in a field of tomatoes, severing and picking up tomato plants from the field, elevating them to a desired height, shaking them, detaching the tomatoes from the plants, separating the tomatoes from the remainder of the plant material, travelling the tomatoes along sorting conveyors while hand sorters work beside said sorting conveyors, the sorted-over and selected tomatoes being received from said sorting conveyors and transferred to a take-off conveyor, said method comprising:

impelling the tomatoes from said travelling step at a desired trajectory toward an electronic sorter, electronically discriminating between said tomatoes, accepting those of a predetermined redness and rejecting tomatoes not of said predetermined redness, transmitting rejected tomatoes to the ground, and transmitting accepted fruit on said take-off conveyor means.

14. A method for sorting good tomatoes from culls on a tomato harvester moving in a field of tomatoes, severing and picking up tomato plants from the field, elevating them to a desired height, shaking them, detaching the tomatoes from the plants, separating the tomatoes from the remainder of the plant material, travelling the tomatoes along sorting conveyors while hand sorters work beside said sorting conveyors, the sorted-over and selected tomatoes being received from said sorting conveyors and transferred to a take-off conveyor, said method comprising:

elevating the tomatoes from said travelling step from the forward end of said sorting conveyor means to a higher level, dropping them forwardly onto an intermediate generally level conveyor, driving said intermediate conveyor at a constant speed regardless of the speeds of all other moving parts of said harvester, engaging the tomatoes dropped on said intermediate conveyor and bringing them to relative rest thereon, so that there is substantially no relative movement between said tomatoes and said intermediate conveyor as they approach the forward end thereof, impelling all tomatoes therefrom at a desired trajectory toward an electronic sorter, electronically discriminating between said tomatoes, accepting those of a predetermined redness and rejecting tomatoes not of said predetermined redness, transmitting rejected tomatoes to the ground, and transmitting accepted fruit on said take-off conveyor means.

* * * * *